United States Patent
Shu et al.

(10) Patent No.: US 10,247,050 B2
(45) Date of Patent: Apr. 2, 2019

(54) ENERGY TOWER OF MULTI-ENERGY-FORM OUTPUT FOR STEPWISE RECOVERING WASTE HEAT OF A GAS ENGINE

(71) Applicant: Tianjin University, Tianjin (CN)

(72) Inventors: Gequn Shu, Tianjin (CN); Xuan Wang, Tianjin (CN); Hua Tian, Tianjin (CN); Jiaqiang Che, Tianjin (CN); Peng Liu, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/739,761

(22) PCT Filed: Jul. 24, 2015

(86) PCT No.: PCT/CN2015/085040
§ 371 (c)(1),
(2) Date: Dec. 25, 2017

(87) PCT Pub. No.: WO2017/012129
PCT Pub. Date: Jan. 26, 2017

(65) Prior Publication Data
US 2018/0187575 A1  Jul. 5, 2018

(30) Foreign Application Priority Data

Jul. 21, 2015 (CN) .......................... 2015 1 0431672

(51) Int. Cl.
*F01K 27/02* (2006.01)
*F01K 25/08* (2006.01)
(Continued)

(52) U.S. Cl.
CPC .............. *F01K 27/02* (2013.01); *F01D 15/10* (2013.01); *F01K 23/065* (2013.01); *F01K 23/18* (2013.01);
(Continued)

(58) Field of Classification Search
CPC ........ F01K 27/02; F01K 25/08; F01K 23/065; F01K 25/14; F01K 23/18; F01K 7/38;
(Continued)

(56) References Cited

U.S. PATENT DOCUMENTS 4,576,005 A * 3/1986 Force ........................ C10G 5/06
123/3
6,523,357 B1 * 2/2003 Katayama ............... F25B 15/06
62/141
(Continued)

FOREIGN PATENT DOCUMENTS

CN 201321918 Y 10/2009
CN 103161607 A 6/2013
(Continued)

*Primary Examiner* — Hoang M Nguyen
(74) *Attorney, Agent, or Firm* — George G. Wang; Bei & Ocean

(57) ABSTRACT

A multi-energy-form output energy tower for stepwise recovering waste heat of a gas engine, comprising an internal combustion engine (1), wherein the present invention also comprises a steam Rankine cycle system (2) which is capable of heat exchanging with the high temperature exhaust exhausted from the IC engine (1) to make the steam turbine (22) do expansion work. An organic Rankine cycle system which is respectively heat exchanged with high temperature exhaust, jacket water and charge air which are exhausted from the IC engine (1), and with condensation heat in the steam Rankine cycle system (2) to do expansion work; a lithium bromide refrigerator (4) which uses jacket waterpart of jacket water discharged from the IC engine (1) as a heat source of the absorption cooling system for heat exchange; and a hot water heat exchanger (5) connected with a high temperature exhaust of the IC engine (1) for heating domestic water. The energy tower of the present invention adopts multiple waste heat recovering methods and combines cooling, heating and power supplying meth-
(Continued)

ods, which improves comprehensive energy utilization efficiency of the system and achieves the effects of energy saving and emission reduction.

5 Claims, 1 Drawing Sheet

(51) Int. Cl.
*F01D 15/10* (2006.01)
*F02G 5/04* (2006.01)
*F01K 23/18* (2006.01)
*F01K 25/14* (2006.01)
*F01K 23/06* (2006.01)
*F01K 7/38* (2006.01)

(52) U.S. Cl.
CPC .............. *F01K 25/08* (2013.01); *F01K 25/14* (2013.01); *F02G 5/04* (2013.01); *F01K 7/38* (2013.01); *F01N 2240/02* (2013.01); *F01N 2240/22* (2013.01); *F02G 2260/00* (2013.01); *F05D 2220/62* (2013.01); *Y02T 10/166* (2013.01)

(58) Field of Classification Search
CPC ........ F01D 15/10; F02G 5/04; F02G 2260/00; F01N 2240/22; F01N 2240/02; F05D 2220/62; Y02T 10/166
USPC .................. 60/614, 616, 618, 655, 651, 671
See application file for complete search history.

(56) References Cited

U.S. PATENT DOCUMENTS

| | | | | |
|---|---|---|---|---|
| 8,567,195 B2* | 10/2013 | Nash | ...................... | F01K 9/003 60/641.1 |
| 8,650,879 B2* | 2/2014 | Freund | .................. | F01K 23/065 60/604 |
| 8,776,517 B2* | 7/2014 | Ernst | ........................ | F01K 9/04 60/39.182 |
| 8,850,814 B2* | 10/2014 | Kaplan | .................. | F01K 23/04 60/618 |
| 2010/0307155 A1 | 12/2010 | Kasuya et al. | | |

FOREIGN PATENT DOCUMENTS

| | | |
|---|---|---|
| CN | 103206317 A | 7/2013 |
| CN | 103352772 A | 10/2013 |
| CN | 103758658 A | 4/2014 |
| JP | 2004251263 A | 9/2004 |

* cited by examiner

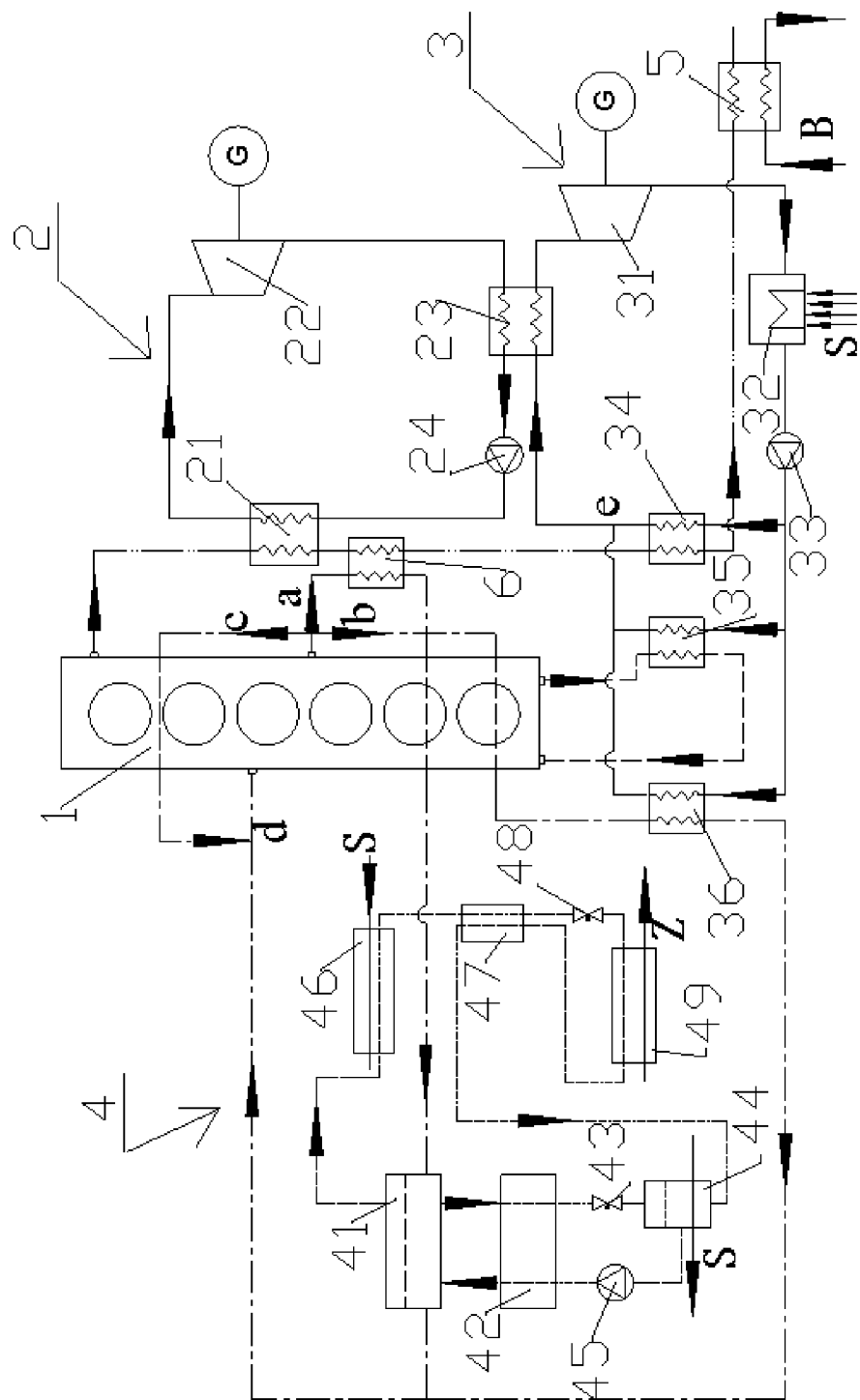

ENERGY TOWER OF MULTI-ENERGY-FORM OUTPUT FOR STEPWISE RECOVERING WASTE HEAT OF A GAS ENGINE

FIELD OF THE INVENTION

The present invention relates to an energy tower for utilizing the waste heat of an internal combustion engine, especially relates to a multi-energy-form output energy tower for stepwise recovering waste heat of a gas engine.

BACKGROUND OF THE INVENTION

With the scarcity of worldwide petroleum resources, internal combustion engines fueled by conventional and unconventional natural gas (short for gas engine) are being used increasingly because of their characteristics of cleanness, high efficiency, low pollution and huge potential of gas resources. In particular, a gas combustion engine for large-scale power generation together with its waste heat recovering system often takes as a set of independent system for supplying energy to the buildings. Many developed countries pay attention to this system and called it as "second generation energy system", which is widely used in the field of energy supply for buildings. The gas engine has various waste heat sources, each with different grades. The main heat source is engine exhaust, which temperature could up to 600° C.; followed by the waste heat of jacket water, which temperature ranges from about 75° C. to 85° C.; furthermore, the temperature of the charge air in a turbocharged combustion engine can be more than 100° C. The heat amount and quality of these main heat sources vary significantly, and the temperature of waste heat is greatly reduced after recovering, owing to large temperature difference waste heat having large span of energy quality. However, any existing waste heat recovering method can only efficiently recycle the heat within a certain energy quality, therefore, a single waste heat recovering method may not make full use of the waste heat of the gas engine.

Therefore, it is required to create a method combining multiple waste heat recovering methods to make full use of waste heat in the gas engine on the basis of the principle of stepwise utilization of energy and considering the different energy quality requirements for building energy (e.g. a building has various requirements to the energy quality, such as requiring high-grade energy for electricity generation and requiring medium/low-grade energy for cooling or heating).

SUMMARY OF THE INVENTION

The objective of the present invention is to provide a multi-energy-form output energy tower for stepwise recovering waste heat of a gas engine which adopts multiple waste heat recovering methods and combines cooling, heating and power supplying.

The technical scheme of the present invention is as follows:

A multi-energy-form output energy tower for stepwise recovering waste heat of a gas engine, comprising an internal combustion engine (hereinafter referred to as IC engine), a steam Rankine cycle system which is capable of heat exchanging with the high temperature exhaust exhausted from the IC engine to make the steam turbine do expansion work, an organic Rankine cycle system which is respectively heat exchanged with high temperature exhaust, jacket water and charge air which are exhausted from the IC engine, and with condensation heat in the steam Rankine cycle system to do expansion work; a Lithium bromide refrigerator which uses part of jacket water discharged from the IC engine; and a hot water heat exchanger connected at the end of the high temperature exhaust for heating domestic water.

The jacket water exhausted from the IC engine is divided into three branches, the first branch passes through a jacket water heater and exchanges heat with the high temperature exhaust out of the steam Rankine cycle system, and then enters the generator of the lithium bromide refrigerator as the heat source of the absorption cooling system for heat exchanging, then enters the IC engine by a joint point; the jacket water in the second branch enters the organic Rankine cycle system for preheating, and then enters the IC engine by a joint point; the jacket water in the third branch enters the IC engine by a joint point directly.

The steam Rankine cycle system comprises: a waste heat boiler, which can heat the water flowing through the internal to high temperature and high pressure gas; a steam turbine for receiving the high temperature and high pressure gas exhausted from the waste heat boiler via pipelines, which is used for doing expansion work; a first condenser for receiving the gas exhausted from steam turbine via pipelines, which is used for cooling and condensing the gas; a pump connected with a condensed water outlet of the first condenser via pipelines, which is used for pressurizing the water; the pressurized water enters the waste heat boiler via pipelines for heat exchanging with high temperature exhaust exhausted from the IC engine again.

The organic Rankine cycle system comprises: an expansion engine, which performs expansion work via high temperature gaseous working medium and then exhausts low temperature gaseous working medium; a second condenser, which is used for cooling the organic working medium; the low temperature liquid working medium output from the second condenser is divided into three liquid working medium branches via pipelines and a working medium pump arranged on the pipelines; wherein, a first branch of the low temperature liquid working medium goes through an exhaust preheater arranged at the exhausting end of the jacket water heat exchanger for heating, and the high temperature liquid working medium exhausted from the exhaust preheater enters a working medium joint point via pipelines; a second branch of the low temperature liquid working medium goes through a charge air preheater for heating by the charge air of the IC engine, and then enters the working medium joint point via pipelines; a third branch of the low temperature liquid working medium goes through a jacket water preheater for heating by the jacket water exhausted from the second branch of the jacket water of the IC engine, and the liquid working medium exhausted from the jacket water preheater enters the working medium joint point via pipelines; the three branches of the low temperature liquid working medium go through the first condenser in the steam Rankine cycle system together to form the high temperature gaseous working medium, and then the high temperature gaseous working medium goes through the expansion engine to do the expansion work via pipelines, and then the working medium after expansion goes through the second condenser and the working medium pump, starting the next cycle.

The high temperature exhaust finally connects with the hot water heat exchanger which is used for heating domestic water.

The lithium bromide refrigerator comprises: a generator which heats the dilute solution flowing through the internal thereof by the jacket water from the second branch, the jacket water exhausted from the generator passes through the joint point via pipelines and enters the IC engine; a part of the heated dilute solution is converted into a gaseous refrigerant which is then passed into a third condenser for condensation via pipelines, the other part of the heated dilute solution is converted into a high temperature concentrated solution which is then passed into an absorber for absorbing the refrigerant by passing through a solution heat exchanger and a first expansion valve successively; the liquid refrigerant exhausted from the third condenser enters an evaporator for heat exchanging the secondary refrigerant by passing through a subcooler and a second expansion valve successively; and the refrigerant exhausted from the evaporator enters the subcooler via pipelines for heat exchanging with the liquid refrigerant from the third condenser, and enters the absorber via pipelines for absorbing the refrigerant and heat exchanging with the cooling water; the dilute solution exhausted from the absorber enters the solution heat exchanger via pipelines and a solution pump arranged on the pipelines for heat exchanging with the concentrated solution exhausted from the generator, and then enters the generator for heat exchanging with the jacket water flowing through the generator.

The present invention provides a waste heat recovering system by adopting multiple waste heat recovering methods and combining cooling, heating and power supplying methods on the basis of the principle of stepwise utilization of energy and considering the different energy quality requirements for building energy. By using steam Rankine cycling, organic Rankine cycling, lithium bromide refrigerator and a plurality of heat exchangers, the present invention stepwise utilizes the waste heat of the gas engine to maximum recycle the waste heat energy of the gas engine so as to provide energies with different quality and functions to the buildings. The present invention makes full use of the waste heat and greatly improves comprehensive energy utilization efficiency of the system and achieves the effects of energy saving and emission reduction.

BRIEF DESCRIPTION OF THE DRAWINGS

FIG. 1 is the structural diagram of the present invention, In which,
1: IC engine 2: steam Rankine cycle system
3: organic Rankine cycle system 4: lithium bromide refrigerator
5: hot water heat exchanger 6: jacket water heater
21: waste heat boiler 22: steam turbine (containing a generator)
23: first condenser 24: pump
31: expansion engine (containing a generator) 32: second condenser
33: working medium pump 34: exhaust preheater
35: charge air preheater 36: jacket water preheater
41: generator 42: solution heat exchanger
43: first expansion valve 44: absorber
45: solution pump 46: third condenser
47: subcooler 48: second expansion valve
49: evaporator S: cooling water
B: domestic hot water Z: secondary refrigerant

DETAILED DESCRIPTION OF THE EMBODIMENTS

The present invention will be further described accompanying with the FIGURES.

As shown in FIG. 1, a multi-energy-form output energy tower for stepwise recovering waste heat of a gas engine of the present invention, comprising a gaseous fuel IC engine 1, a steam Rankine cycle system 2 which is capable of heat exchanging with the high temperature exhaust exhausted from the IC engine 1 to make the steam turbine do expansion work, an organic Rankine cycle system 3 which is respectively heat exchanged with high temperature exhaust, the jacket water and charge air which are exhausted from the IC engine, and with condensation heat in the steam Rankine cycle system 2 to do expansion work; a lithium bromide refrigerator 4 which uses jacket water discharged from the IC engine 1 as a heat source of the absorption cooling system; and a hot water heat exchanger 5 connected at the end of the high temperature exhaust for heating domestic water.

The jacket water exhausted from the IC engine 1 is divided into three branches, the first branch a passes through a jacket water heater 6 and exchanges heat with the high temperature exhaust, which temperature is about 180° C. after heat exchanging with the steam Rankine cycle system 2, and then enters the generator of the lithium bromide refrigerator 4 as the heat source, wherein the temperature of the jacket water exhausted from the generator is slightly lower than the required inlet temperature of the IC engine 1, and then the jacket water enters the IC engine 1 by a joint point d; the jacket water in the second branch b enters the organic Rankine cycle system 3 to preheat the organic working medium inside the organic Rankine cycle system 3, wherein the temperature of the jacket water after preheating the working medium is slightly lower than the required inlet temperature of the IC engine 1, and then the jacket water enters the IC engine 1 by the joint point d; and the jacket water in the third branch c enters the joint point d directly for regulating the temperature of the jacket water after mixing the three branches to satisfy the required inlet temperature of the IC engine 1, and then the jacket water enters the IC engine 1.

In order to avoid additional cooling the jacket water when the temperature of the mixed jacket water of the three branches is higher than the required inlet temperature of the IC engine, the design temperature of jacket water of the first branch a and the second branch b before passing into the joint point d are lower than the required inlet temperature of the IC engine. When there is a small temperature fluctuation in the joint point d, the final inlet temperature of jacket water of the IC engine can be regulated by regulating the flow of the third branch c.

The steam Rankine cycle system 2 comprises: a waste heat boiler 21 which can heat the water flowing through the internal to high temperature and high pressure gas; a steam turbine 22 for receiving the high temperature and high pressure gas exhausted from the waste heat boiler via pipelines, which is used for doing expansion work; a first condenser 23 for receiving the gas exhausted from steam turbine via pipelines, which is used for cooling and condensing the gas; a pump 24 connected with a condensed water outlet of the first condenser 23 via pipelines, which is used for pressurizing the water; the pressurized water enters the waste heat boiler 21 via pipelines for heat exchanging with high temperature exhaust exhausted from the IC engine 1, and the steam turbine 22 is a back-pressure steam turbine.

The steam turbine 22 is a back-pressure steam turbine, the outlet pressure thereof is slightly higher than the atmosphere, thus the condensation temperature of the water in the condenser 24 is slightly higher than 100° C. Due to the high condensation temperature, the condensation heat can be the evaporation heat source for the organic Rankine cycle system 3. The water condensed into liquid is pumped to waste heat boiler 21 to continue heating for the next cycle. The temperature of high temperature exhaust gas in waste heat boiler falls to about 180° C. after one heat exchange.

The organic Rankine cycle system 3 comprises: an expansion engine 31, which performs expansion work via high temperature gaseous working medium and then exhausts low temperature gaseous working medium via pipelines; a second condenser 32, which is used for cooling the organic working medium; the low temperature liquid working medium output from the second condenser 32 is divided into three liquid working medium branches via pipelines and a working medium pump 33 arranged on the pipelines; wherein, the first branch of the low temperature liquid working medium goes through an exhaust preheater 34 arranged at the exhausting end of the jacket water heater 6 for heating the low temperature liquid working medium, and the high temperature liquid working medium exhausted from the exhaust preheater 34 enters a working medium joint point e; the second branch of the low temperature liquid working medium goes through a charge air preheater 35 for heating the low temperature liquid working medium by the charge air of the IC engine 1, and then enters the working medium joint point e via pipelines; the third branch of the low temperature liquid working medium goes through a jacket water preheater 36 for heating the low temperature liquid working medium by the jacket water exhausted from the second branch b, and the liquid working medium exhausted from the jacket water preheater 36 enters the working medium joint point e via pipelines; the three branches of the low temperature liquid working medium converge into the joint point e and go through the first condenser 23 (equivalent to playing the roles of evaporator in the organic Rankine cycle system) in the steam Rankine cycle system 2 together to form the high temperature gaseous working medium by absorbing the condensation heat, and then the high temperature gaseous working medium exhausted from the first condenser 23 goes through the expansion engine 31 to do the expansion work, and then the working medium after expansion goes through the second condenser 32 becoming liquid state, and passes through the working medium pump 33 for compression and then goes for next cycle.

During the organic Rankine cycle system 3, in order to make full use of the waste heat of different heat sources having similar energy qualities, the low temperature liquid working medium output from the condenser 32 and passed through the working medium pump is divided into three branches, wherein, the temperature of the low temperature liquid working medium in the first branch which is preheated by the jacket water is close to the outlet temperature of the jacket water; the temperature of the low temperature liquid working medium in the second branch which is preheated by the charge air is achieved to a comparatively high temperature, i.e., close to the charge air temperature but no more than the evaporation temperature of the organic Rankine cycle system 3; meanwhile, the charge air is then cooled to close to the working medium outlet temperature in the condenser of the organic Rankine cycle system 3 so as to meet the inlet temperature requirement of entering into the cylinder for combustion, thus the charge air preheater can also act as the air intercooler; the low temperature liquid working medium in the third branch is preheated to achieve a comparatively high temperature by the exhausts which performs twice heat exchanging, after that the temperature in the third branch is close to the evaporation temperature of the organic Rankine cycle system 3; the three branches are then converged together, and the working medium may be a two-phase fluid. Finally, the organic working medium absorbs the condensation heat of the water in the first condenser (equivalent to the evaporator of the organic Rankine cycle system 3) of the steam Rankine cycle system 2, so that the working medium becomes high temperature gaseous working medium. The high temperature gaseous working medium then goes through the expansion engine to produce work, and then goes through the second condenser becoming liquid working medium, and finally goes through the working medium pump to send to each heat exchanger for the next cycle.

The high temperature exhaust after three times heat exchange connects with the hot water heat exchanger 5 which is used for heating domestic water.

The lithium bromide refrigerator 4 comprises: a generator 41 which heats the dilute solution flowing through the internal thereof by the jacket water from the second branch b, the jacket water exhausted from the generator 41 passes through the joint point d via pipelines and enters the IC engine 1; a part of the heated dilute solution is converted into a gaseous refrigerant which is then passed into a third condenser 46 for condensation via pipelines, the other part of the heated dilute solution is converted into a high temperature concentrated solution which is then passed into an absorber 44 for absorbing the refrigerant by passing through a solution heat exchanger 42 and a first expansion valve 43 successively; the liquid refrigerant exhausted from the third condenser 46 enters an evaporator 49 for producing cooling by passing through a subcooler 47 and a second expansion valve 48 successively; and the refrigerant exhausted from the evaporator 49 enters the subcooler 47 via pipelines for heat exchanging with the liquid refrigerant from the third condenser 46, and enters the absorber 44 via pipelines for absorbing the refrigerant and heat exchanging with the cooling water; the dilute solution exhausted from the absorber 44 enters the solution heat exchanger 42 via pipelines and a solution pump 45 arranged on the pipelines for heat exchanging with the concentrated solution exhausted from the generator 41, and then enters the generator 41 for heat exchanging with the jacket water flowing through the generator 41.

In the multi-energy-form output energy tower for stepwise recovering waste heat of a gas engine of the present invention, the exhausted gas goes through four times heat exchanging, which are: the first heat exchanging heats the water into superheated steam, and temperature of which is about 180° C.; the second heat exchanging heats the jacket water which acts as the heat source of the absorption cooling system so as to increase the final temperature of evaporation in the generator, and to improve the refrigerating capacity accordingly, and the exhaust temperature after heat exchanging is about 110° C.; the third heat exchanging transfers the residual high temperature heat to the organic Rankine cycle system 3 to increase the output power of the organic Rankine cycle system 3, the exhaust temperature after heat exchanging is about 60° C.; the last heat exchanging heats the low temperature domestic water (such as bath water), due to high hydrogen content in gaseous fuel, the combusted exhausted gas contains high steam which is then condensed into water at the temperature around 60° C. and releases latent heat of condensation; the liquid latent heat can be used for heating the low temperature domestic water.

Embodiment:

The parameters of the gas engine and the waste heat source thereof in the embodiment are shown in table 1.

TABLE 1

The parameters of the gas engine and the waste heat
source thereof (under rated operating condition)

| Parameter | Value |
|---|---|
| Rated power of gas engine | 1100 kW |
| Temperature of exhausted gas | 540° C. |
| Volume flow of inlet gas (under standard condition) | 1.16 m3/s |
| Volume flow of fuel gas (under standard condition) | 0.0784 m3/s |
| Flow of jacket water | 8.33 kg/s |
| Outlet temperature of jacket water | 85° C. |
| Inlet temperature of jacket water | 75° C. |
| Air temperature after pressurized by the turbocharger | 130° C. |

As the first stage for recovering the waste heat of the exhausted gas, the steam Rankine cycle system consists of the waste heat boiler, the back-pressure steam turbine, the condenser and the pump which are connected successively. In the first recovering stage, the exhaust after the turbocharger enters the waste heat boiler for heating the gas into a superheated steam under the pressure of 1.6 MPa; and then the superheated steam enters the back-pressure steam turbine, for doing expansion work; a generator is connected to the steam turbine for generating power to the buildings; the steam turbine also connects with the condenser, the expanded steam is condensed into a saturated liquid under the pressure of 2 bar and temperature of 120° C. in the condenser, and then is pressurized to evaporation pressure by the pump and sent back to the waste heat boiler to complete the cycle. After a heat exchange in the waste heat boiler, the gas is reduced to about 180° C.

The condenser in the steam Rankine cycle system, which is the connecting part between the steam Rankine cycle system and the organic Rankine cycle (hereinafter referred to as ORC) system, is the evaporator of the organic Rankine cycle system, the hot liquid in the heat exchanger is the working medium of the steam Rankine cycle system, the cold liquid is the organic working medium of the ORC system, and the organic working medium in this embodiment is R123. The working medium R123 absorbs condensation heat from the water of the steam Rankine cycle and becomes saturated steam under the pressure of 0.97 MPa and temperature of 110° C., the steam then enters the expansion engine for doing the expansion work; a generator is connected to the expansion engine for generating power. The expansion engine also connects with a condenser for condensing the expanded working medium into the saturated liquid working medium under the temperature of 38° C. via the external cooling water. The working medium after condensation is then divided into three branches; wherein, the working medium in the first branch enters the jacket water preheater and then enters the working medium joint point; the hot liquid in the preheater is part of the jacket water, which inlet temperature of the preheater is about 85° C. and outlet temperature is about 70° C., the working medium is heated to 80° C. in the jacket water preheater. The working medium in the second branch enters the charge air preheater and then enters the working medium joint point; the hot liquid in the preheater is the charge air which inlet temperature in the heat exchanger is about 130° C. and is then cooled down to about 43° C., while the working medium is heated to about 110° C. The working medium in the third branch enters the exhaust preheater and then enters the working medium joint point; the hot liquid in the preheater is the low temperature exhaust gas after passed through the jacket water preheater, which inlet temperature of the preheater is about 120° C., the working medium enters the exhaust preheater for heating to about 100° C., while the outlet temperature of exhaust thereof is down to about 60° C. The three branches are then converged into a flow having the temperature about 100° C. An evaporator of the ORC system connects with the joint point to heat the working medium into the saturated steam, wherein the output power of ORC is about 85 KW.

After performing cooling function in the gas engine, the jacket water is exhausted from the engine due to the high temperature. The jacket water is then divided into three branches: the jacket water in the first branch enters the jacket water preheater for preheating the organic working medium and then enters the joint point, and the temperature is down to about 70° C. after preheating. The jacket water in the second branch connects with an jacket water heater, a generator of the lithium bromide refrigerator and joint point successively; wherein the jacket water is heated to about 90° C. by the low temperature exhaust gas that has been heated once and about 180° C., and then enters the generator of the lithium bromide refrigerator as a heat source of the absorption cooling system and then enters the joint point; the outlet temperature of the jacket water after exhausted from the generator is down to about 70° C. The temperature of exhaust gas is reduced to about 120° C. after secondary heat exchange. The jacket water of the third branch enters the joint point directly, and the three branches converge into a flow and then enters the inlet of the cylinder of the gas engine; wherein, the temperature of the converged jacket water meets the temperature requirement of 75° C. The absorption cooling system can generate about 200 kW power for cooling.

The flow path of the exhaust gas connects to the waste heat boiler, the jacket water heater, the ORC preheater, domestic water heater successively, and exhausts into the atmosphere finally. The whole system of the present invention can recycle about 175 KW electric supply, 200 kW power for cooling and 100 KW power for heating the domestic water.

What is claimed is:

1. A multi-energy-form output energy tower for stepwise recovering waste heat of a gas engine, comprising an internal combustion engine (1), wherein the present invention also comprises a steam Rankine cycle system (2) which is capable of heat exchanging with the high temperature exhaust exhausted from the IC engine (1) to make a steam turbine (22) do expansion work; an organic Rankine cycle system which is respectively heat exchanged with high temperature exhaust, jacket water, charge air which are exhausted from the IC engine (1), and condensation heat in the steam Rankine cycle system (2) to do expansion work; a lithium bromide refrigerator (4) which uses part of jacket water discharged from the IC engine (1); and a hot water heat exchanger (5) connected at the end of the high temperature exhaust for heating domestic water;

wherein the jacket water exhausted from the IC engine (1) is divided into three branches, the first branch (a) passes through a jacket water heater (6) and exchanges heat with the high temperature exhaust out of the steam Rankine cycle system (2), and then enters the generator of the lithium bromide refrigerator (4) as the heat source of the absorption cooling system, finally enters the IC engine (d) by a joint point (d); the jacket water in the second branch (b) enters the organic Rankine cycle system (3) for preheating, and then enters the IC engine (1) by a joint point (d); the jacket water in the third branch (c) enters the IC engine (1) by a joint point (d) directly.

2. The multi-energy-form output energy tower for stepwise recovering waste heat of a gas engine according to claim 1, wherein the steam Rankine cycle system (2) comprises: a waste heat boiler (21), which can heat the water flowing through the internal to high temperature and high pressure gas; the steam turbine (22) for receiving the high temperature and high pressure gas exhausted from the waste heat boiler (21) via pipelines, which is used for doing expansion work; a first condenser (23) for receiving the gas exhausted from steam turbine (22) via pipelines, which is used for cooling and condensing the gas; a pump (24) connected with a condensed water outlet of the first condenser (23) via pipelines, which is used for pressurizing the water; the pressurized water enters the waste heat boiler (21) via pipelines for heat exchanging with high temperature exhaust exhausted from the IC engine (1) again.

3. The multi-energy-form output energy tower for stepwise recovering waste heat of a gas engine according to claim 1, wherein the organic Rankine cycle system (3) comprises: an expansion engine (31), which performs expansion work via high temperature gaseous working medium and then exhausts low temperature gaseous working medium; a second condenser (32), which is used for cooling the organic working medium; the low temperature liquid working medium output from the second condenser (32) is divided into three liquid working medium branches via pipelines; and a working medium pump (33) arranged on the pipelines;

wherein, a first branch of the low temperature liquid working medium goes through an exhaust preheater (4) arranged at the exhausting end of the jacket water heat exchanger (6) for heating, and the high temperature liquid working medium exhausted from the exhaust preheater (34) enters a working medium joint point (e) via pipelines; a second branch of the low temperature liquid working medium goes through a charge air preheater (35) for heating by the charge air of the IC engine (1), and then enters the working medium joint point (e) via pipelines; a third branch of the low temperature liquid working medium goes through a jacket water preheater (36) for heating by the jacket water exhausted from the second branch (b) of the jacket water of the IC engine (1), and the liquid working medium exhausted from the jacket water preheater (36) enters the working medium joint point (e) via pipelines; the three branches of the low temperature liquid working medium go through the first condenser (23) in the steam Rankine cycle system (2) together to form the high temperature gaseous working medium, and then the high temperature gaseous working medium goes through the expansion engine (31) to do the expansion work, finally the working medium after expansion goes through the second condenser (32) and the working medium pump (33), starting the next cycle.

4. The multi-energy-form output energy tower for stepwise recovering waste heat of a gas engine according to claim 3, wherein the high temperature exhaust connects with the hot water heat exchanger (5) which is used for heating domestic water, the high temperature exhaust of which goes through the exhaust preheater (34) for heat exchanging by the low temperature liquid working medium.

5. The multi-energy-form output energy tower for stepwise recovering waste heat of a gas engine according to claim 1, wherein the lithium bromide refrigerator (4) comprises: a generator (41) which heats the dilute solution flowing through the internal thereof by the jacket water from the second branch (b), the jacket water exhausted from the generator (41) passes through the joint point (d) via pipelines and enters the IC engine (1); a part of the heated dilute solution is converted into a gaseous refrigerant which is then passed into a third condenser (46) for condensation via pipelines, the other part of the heated dilute solution is converted into a high temperature concentrated solution which is then passed into an absorber (44) for absorbing the refrigerant by passing through a solution heat exchanger (42) and a first expansion valve (43) successively; the liquid refrigerant exhausted from the third condenser (46) enters an evaporator (49) for heat exchanging the secondary refrigerant by passing through a subcooler (47) and a second expansion valve (48) successively; and the refrigerant exhausted from the evaporator (49) enters the subcooler (47) via pipelines for heat exchanging with the liquid refrigerant from the third condenser (46), and enters the absorber (44) via pipelines for absorbing the refrigerant and heat exchanging with the cooling water; the dilute solution exhausted from the absorber (44) enters the solution heat exchanger (42) via pipelines and a solution pump (45) arranged on the pipelines for heat exchanging with the concentrated solution exhausted from the generator (41), and then enters the generator (41) for heat exchanging with the jacket water flowing through the generator (41).

\* \* \* \* \*